July 2, 1929.                D. W. WOLF                1,719,037
                          GAUGE ROD WIPER
                         Filed Jan. 31, 1929
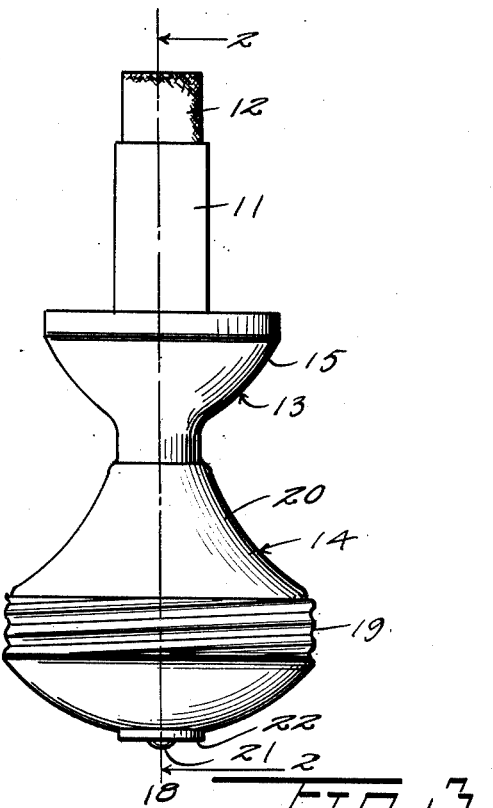
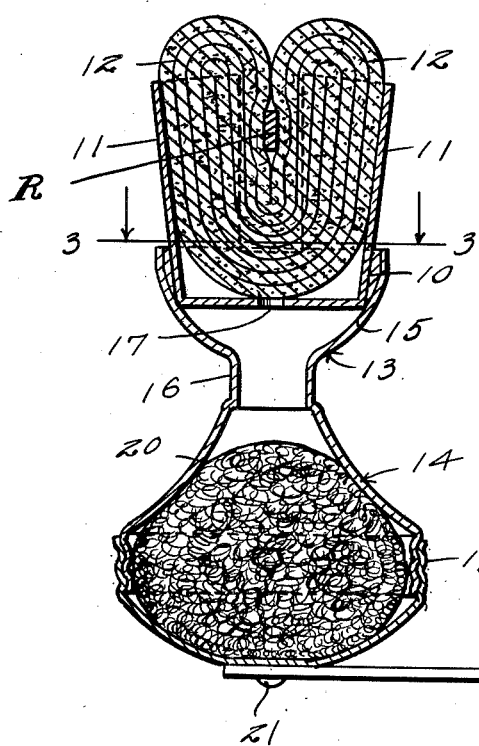
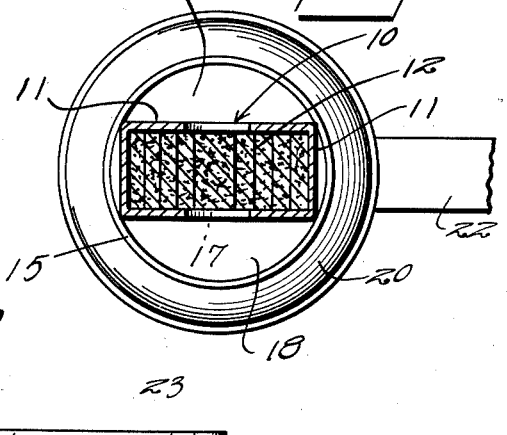
Inventor
D. W. Wolf
By Frederick S. Stitt
Attorney Patented July 2, 1929.

1,719,037

UNITED STATES PATENT OFFICE.

DORSEY W. WOLF, OF LEBANON, PENNSYLVANIA.

GAUGE-ROD WIPER.

Application filed January 31, 1929. Serial No. 336,520.

This invention relates to gauge rod wipers, and more specifically to a device adapted to be secured in a convenient position adjacent the engine of an automobile and employed for removing oil from the gauge rods, so that a clean gauging surface may be provided and an accurate determination of the depth of oil in the base afforded.

The object of this invention is to provide an improved device of this character preferably supported from the engine and at a point convenient to an attendant inspecting the gauge rod embodying a felt or other wiper between portions of which the rod may be conveniently passed to wipe excess oil therefrom, means being provided to prevent drip from this wiper to the surface of the engine and to collect such drip until, at a convenient time, the attendant or operator removes the same.

A further object of the invention is to provide an arrangement such that the drip oil collected may be very readily removed.

These and other objects I attain by the construction shown in the accompanying drawings, wherein for the purpose of illustration is shown a preferred embodiment of my invention and wherein:—

Figure 1 is a side elevation of a gauge rod wiper constructed in accordance with my invention;

Figure 2 is a section on the line 2—2 of Figure 1;

Figure 3 is a section on the line 3—3 of Figure 2.

Referring now more particularly to the drawings, the numeral 10 generally designates a funnel substantially rectangular in plan and having arising from the ends thereof opposed U-shaped guides 11, each of which supports a wiper pad 12 preferably constructed by forming a flattened roll of felt stripping and folding the same centrally. Adjacent faces of these pads abut but are not connected to one another, so that a gauge rod R may be introduced therebetween at the upper end, slid downwardly between the pads and then drawn through the pads to wipe excess oil therefrom.

In combination with this structure, I provide a supporting receptacle 13 comprising a hollow base 14 and a hollow open-topped head 15 connected to the base by a preferably restricted neck 16. The funnel 10 is inserted into the head 15 and secured therein with the outlet opening 17 of the lower end thereof in alignment with this neck. The funnel is of the same length as the diameter of the head, but is of less width than this diameter, so that at opposite sides of this funnel, spaces are provided, as indicated at 18. The base 14 of the receptacle is formed in two readily disengageable sections, which may be connected by threading, as indicated at 19. The upper section 20 is integrally connected to the neck while the lower section has attached thereto, by riveting, as at 21, or other suitable means, an arm 22, the outer end of which has an opening 23 for the passage of one of the normal securing bolts of the engine. This bolt may be removed, passed through the arm and the bolt replaced, so that the arm will be very rigidly held. The container is arranged in a vertical position, and it will be obvious that excess oil contained in the pads and draining therefrom will pass through the opening 17 of the funnel 16 into the container and to the base thereof.

Excess oil wiped from the gauge and dripping from the sides of the pad and funnel will likewise pass through the openings 18 into the container and so to the base.

Within this base is arranged an absorbent material, such as waste or the like, in which this oil may gather. By simply separating the sections of the base and removing this waste and substituting a fresh piece, the container is emptied without any messy operation which is liable to cause oil to be deposited upon the engine with the accompanying detraction from the appearance of the engine and production of disagreeable odors in operation.

Since the construction hereinbefore set forth is capable of a certain range of change and modification without materially departing from the spirit of the invention, I do not limit myself thereto except as hereinafter claimed.

I claim:—

1. In a gauge rod wiper, a pair of wiper pads, means for supporting the pads in opposed contacting relation to permit the passage of a gauge rod between adjacent faces thereof, and a receptacle supporting said means and having upwardly directed openings underlying the side faces of the pads to collect excess oil dripping therefrom.

2. In a gauge rod wiper, a pair of wiper pads, means for supporting the pads in opposed contacting relation to permit the passage of a gauge rod between adjacent faces thereof, and a receptacle supporting said means and having upwardly directed openings underlying the side faces of the pads to collect excess oil dripping therefrom, the supporting means for the pad including a funnel into which the lower ends of the pads extend, the outlet of said funnel being directed into the receptacle.

3. In a gauge rod wiper, a pair of wiper pads, means for supporting the pads in opposed contacting relation to permit the passage of a gauge rod between adjacent faces thereof, and a receptacle supporting said means and having upwardly directed openings underlying the side faces of the pads to collect excess oil dripping therefrom, said wiper pads comprising the ends of a flat coil of felt stripping which is centrally folded and placed within said supporting means.

4. In a gauge rod wiper, a container, a funnel arranged within the upper end of the container and of such width that spaces are formed between opposite sides thereof and the opposed portions of the wall of the container through which spaces fluid may pass, opposite ends of the funnel having opposed U-shaped channel members arising therefrom, and pads engaged in said U-shaped channel members and having their opposed faces in contact with one another.

In testimony whereof I affix my signature.

DORSEY W. WOLF.